(12) United States Patent
Rzepecki et al.

(10) Patent No.: US 12,027,910 B1
(45) Date of Patent: Jul. 2, 2024

(54) BATTERY POWER SYSTEM

(71) Applicant: Monumo Limited, Saffron Walden (GB)

(72) Inventors: Jaroslaw Pawel Rzepecki, Saffron Walden (GB); Ian Murphy, Saffron Walden (GB); Bhaskar Sen, Saffron Walden (GB)

(73) Assignee: Monumo Limited, Essex (GB)

( * ) Notice: Subject to any disclaimer, the term of this patent is extended or adjusted under 35 U.S.C. 154(b) by 0 days.

(21) Appl. No.: 18/303,059

(22) Filed: Apr. 19, 2023

(51) Int. Cl.
*H02J 7/34* (2006.01)
*B60W 10/26* (2006.01)
*B60W 20/12* (2016.01)
*H02J 7/14* (2006.01)

(52) U.S. Cl.
CPC .............. *H02J 7/342* (2020.01); *B60W 10/26* (2013.01); *B60W 20/12* (2016.01); *H02J 7/1446* (2013.01); *H02J 7/345* (2013.01)

(58) Field of Classification Search
CPC .......... H02J 7/342; H02J 7/1446; H02J 7/345; B60W 10/26; B60W 20/12
See application file for complete search history.

(56) References Cited

U.S. PATENT DOCUMENTS 10,290,912 B2 * 5/2019 Jiang .................. H01M 50/296

* cited by examiner

*Primary Examiner* — Shon G Foley
(74) *Attorney, Agent, or Firm* — Harness, Dickey & Pierce, P.L.C.

(57) ABSTRACT

A battery power system for powering at least one electric motor. The system comprises a main battery and an intermediate storage device electrically coupled to the main battery such that the intermediate storage device can be charged by the main battery, and the intermediate storage device being configured to supply power to the electric motor. The intermediate storage device is constructed and configured to accept and deliver charge at a higher rate than the main battery whilst having a lower energy storage capacity than the main battery.

13 Claims, 7 Drawing Sheets

BATTERY POWER SYSTEM

TECHNICAL FIELD

The present disclosure concerns a battery power system for powering electric motors.

BACKGROUND

Electric vehicles use both AC and DC electric motors. The electric motors are powered by a battery, often referred to as a traction battery, in conjunction with a power controller. The power controller converts the DC power from the battery to AC or DC power for use by the AC or DC electric motor. The battery for operating the electric motor needs to be capable of providing power to meet the driving requirements of the electric vehicle.

SUMMARY

According to an aspect of the present invention there is provided a battery power system for powering at least one electric motor. The system comprises a main battery and an intermediate storage device electrically coupled to the main battery such that the intermediate storage device can be charged by the main battery, and the intermediate storage device being configured to supply power to the electric motor. The intermediate storage device is constructed and configured to accept and deliver charge at a higher rate than the main battery whilst having a lower energy storage capacity than the main battery.

The intermediate storage device may be an intermediate battery having a Peukert constant less than a Peukert constant of the main battery, and an energy storage capacity less than an energy storage capacity of the main battery. As such the intermediate battery, whilst being a relatively high performance component, may contribute a relatively small proportion of the overall cost of the system. The Peukert constant of the intermediate battery may be less than 1.1 and the Peukert constant of the main battery is greater than 1.1.

The intermediate storage device may be a supercapacitor.

The capacity of the intermediate storage device may be 5% or less than the capacity of the main battery.

The battery power system may comprise a power controller electrically coupled to the intermediate storage device to electrically couple power from the intermediate storage device to the electric motor, the power controller comprising a first power converter configured to convert power received from the intermediate storage device from a first type to a second type to power the electric motor and to convert regenerated power received from the electric motor from the second type to the first type for storage in the intermediate storage device.

The power controller may be further directly electrically coupled to the main battery, the power controller further comprising a second power converter configured to convert power received from the main battery from a third type to said second type to power the electric motor and, optionally, to convert regenerated power received from the electric motor from the second type to the third type for storage in the main battery, and a switching circuit for selectively coupling the first and/or second power converters to the electric motor.

The power controller may further comprise a predictive control system configured to identify a future event and operate said switching circuit in anticipation of that event.

The power controller may further comprise a predictive control system configured to identify a future event that might require a higher or lower level of charge in the intermediate storage device than is currently stored in the device and, in response, cause the power controller to charge or discharge the intermediate battery to that higher or lower level. The predictive control system may comprise a machine-learning model.

According to a further aspect of the present invention there is provided an electric vehicle comprising one or more electric motors, and the battery power system of the above aspect of the invention electrically coupled to the or each electric motor to supply power thereto.

The predictive control system may receive data comprising at least one of:
  geolocation data,
  data related to an operator of the electric motor of the electric vehicle,
  data related to multiple drivers of electric vehicles,
  data related to road driving conditions,
  data regarding driving cycles,
  data regarding the battery and an operation of the electric motor,
  real-time traffic data,
  actual vehicle speed data.

It will be appreciated that the use of the predictive system/algorithm allows charging between the main battery and the intermediate storage device to be carried out relatively slowly and low current, making that transfer efficient from the capacity of the main battery point which has a relatively high Peukert constant.

DETAILED DESCRIPTION

Figure 1:
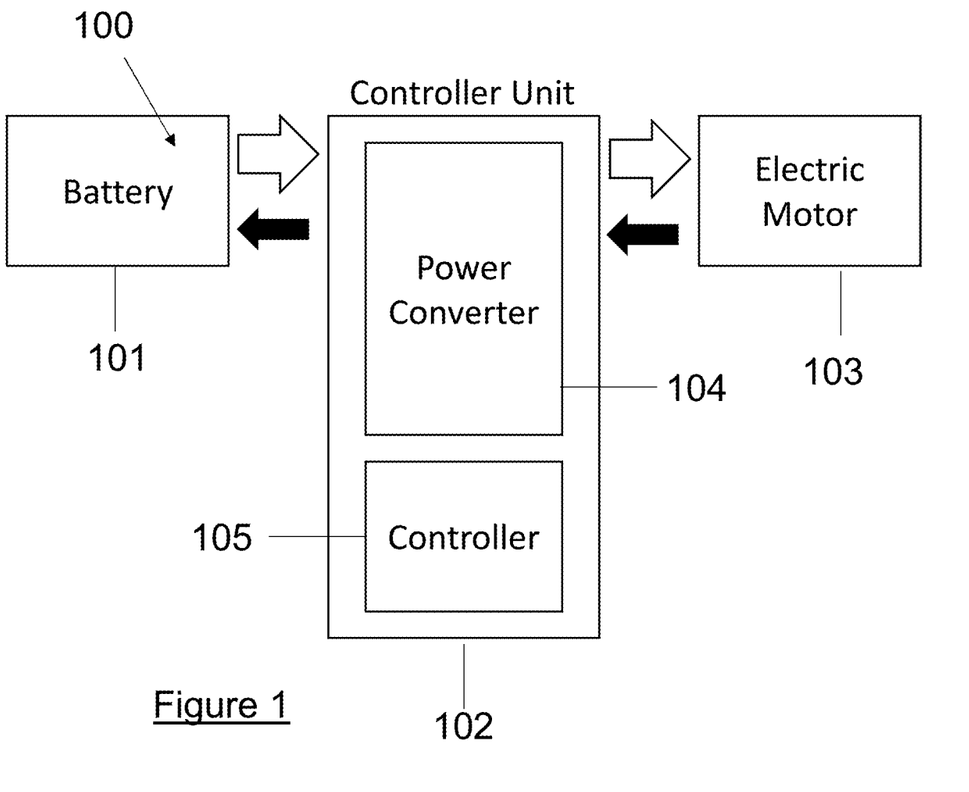
FIG. 1 illustrates a battery power system known in the art.

FIG. 1 illustrates schematically certain main components of a battery power system 100 including an electric motor, for example an electric motor of a battery-powered electric vehicle (referred to hereinafter as simply an "electric vehicle" or "EV"). In the field of EVs, electric battery power systems or powertrains, include components that generate and deliver power to electric motors for fully electric or hybrid electric vehicle applications.

The illustrated battery power system 100 comprises a traction battery 101, at least one controller unit 102 and at least one electric motor 103. The exact configuration and number of the batteries 101 and controller unit 102 depends on the type of application and design decisions made by the manufactures. The battery power system 100 may further comprise other systems or components, such as 12V auxiliary battery, etc.

The battery 101 is configured to supply a DC current to the controller unit 102. The battery 101 may be a Lithium-Ion battery, a Nickel-Metal Hybride battery, a Lead-Acid battery or any battery suitable for use in an EV. The battery 101 may comprise a multiplicity of battery cells connected in parallel and/or series. The controller unit 102 operates between the battery 101 and the electric motor 103 to control the flow of power there between and thereby control the electric vehicle's speed and acceleration/deceleration. The controller unit 102 is configured to convert DC current from the battery pack 101 into a form suitable for use by the electric motor 103. In the case of AC motors, the controller transforms the battery's DC current into AC current. In the case of DC motors, it transforms the battery's DC current level to another DC level suitable for use by the electric motor 103.

The controller unit 102 of FIG. 1 comprises a power converter 104 and a controller 105. The power converter 104 may be an inverter for DC-AC conversion when used with an AC electric motor or a converter for DC-DC conversion when used with a DC electric motor. The controller 105 can reverse the polarity of power supplied to the electric motor 103 so as to reverse the direction of rotation of the motor and cause the vehicle to reverse. It can also cause the electric motor 103 to operate as a generator so that the kinetic energy of motion can be used to recharge the battery 101 when a vehicle brake is applied, so-called regenerative braking.

In FIG. 1, the large arrows moving from left to right illustrate the energy flow when the electric motor 103 is operating to drive the EV forward (forward operation). The smaller black arrows moving from right to left illustrate the energy flow during regenerative breaking (regenerative operation), where the energy flows from the at least one motor 103 (which acts as generator) to the battery 101.

The battery capacity of a battery is a value that characterizes how much electrical current the battery can provide from a fully charged state to a fully empty state. Battery capacity is typically measured in Ah (Ampere-hour). The battery capacity is usually measured on the assumption of a 20 hour (20h) discharge. For example, if a battery can produce a 5 Amp current for 20 h, then the battery will be stated as having a 100 Ah capacity. Of course in practice the duration for which a battery can supply power depends on the actual current being drawn. For example, a 100 Ah battery would supply power for less than one hour if a 100 Amp current were drawn from it.

The relationship between actual battery discharge time and discharge current is not however linear for a given battery. An empirical law—Peukert Law—approximately determines what is the effective battery capacity for different values of the current being drawn. In general, the higher the current the less effective capacity is provided:

$$t = H * \left(\frac{C}{I * H}\right)^k$$

where t is the actual time to discharge the battery (in hours), H is the rated discharge time (in hours), C is the rated capacity at that discharge rate (in ampere hours), I is the actual discharge current (in amperes), and k is the Peukert constant (dimensionless).

Figure 2:
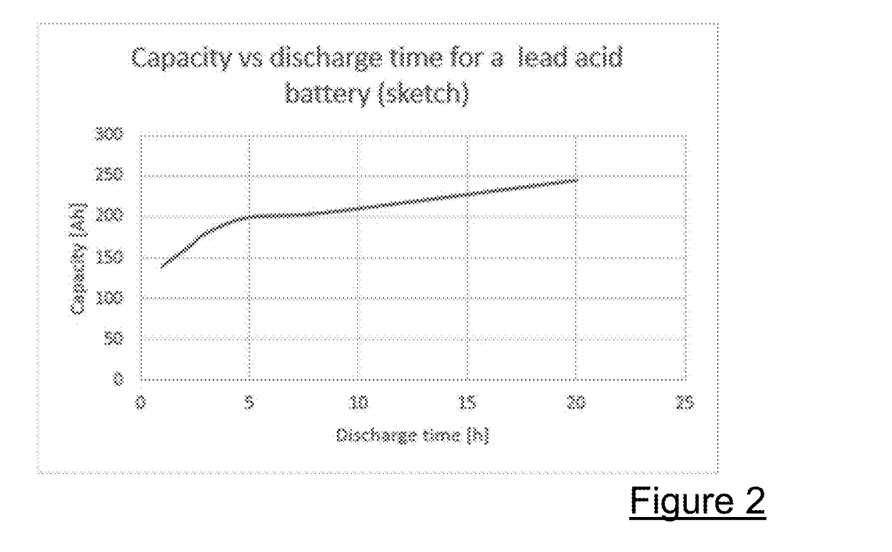
FIG. 2 illustrates a capacity-discharge relationship of an example battery.

Different battery types have different Peukert constants (generally between 1.1 to 1.6). The application of Peukert Law indicates that some battery types are better at handling fast, high current discharges (and charges) than others. FIG. 2 illustrates an example capacity versus discharge time for a lead acid battery.

In the field of EVs (although also in other applications) there is a need on the one hand for a large capacity battery to facilitate the a relatively long driving range, whilst on the other hand also providing high discharge rates to allow for efficient acceleration when required (and potentially high recharge rates when regenerative braking is applied). In that past it has proved challenging to achieve both of these desired characteristics within a given powertrain at a cost-effective level.

Figure 3:
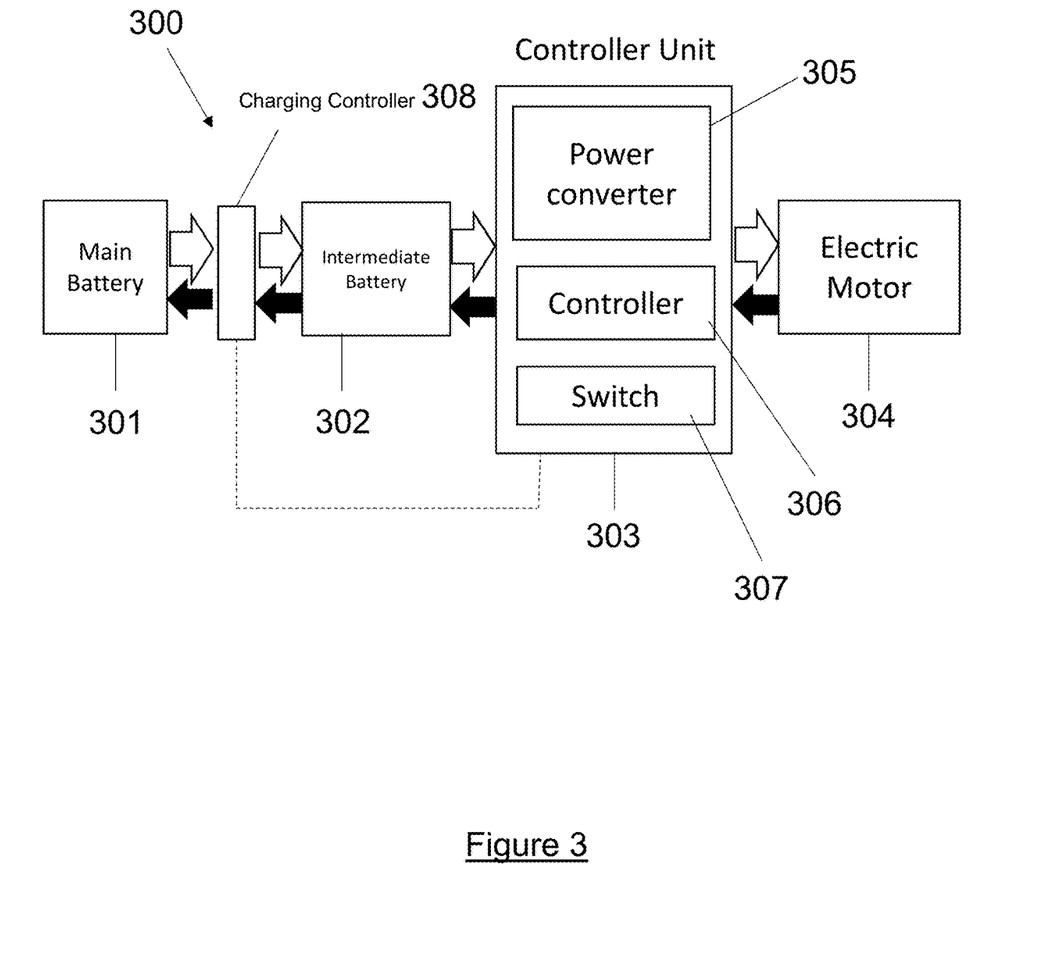
FIG. 3 illustrates a battery power system according to an embodiment.

FIG. 3 illustrates a battery power system 300 according to an embodiment. The battery power system 300 comprises at least one main battery 301, referred to hereinafter and in the context of EVs as the "traction" battery, electrically coupled, via a charging controller 308, to at least one intermediate storage device such as an intermediate battery 302. The traction battery 301 and the intermediate battery 302 are connected so as to enable the intermediate battery 302 to be charged by the traction battery 301, and the traction battery 301 to be charged by the intermediate battery 302 (i.e. reverse charging). The intermediate battery 302 is electrically coupled to at least one power controller unit 303. The power controller unit 303 is electrically coupled to the electric motor 304.

The intermediate battery 302 is optimised for fast discharge (i.e. rapid acceleration) and/or charge (i.e. regenerative breaking). In other words the intermediate battery is constructed and configured to accept very high charging and discharging currents. To achieve this the intermediate battery 302 is of a type having a Peukert k-number that is relatively low. In an embodiment, the intermediate battery 302 has a Peukert constant that is significantly less than that of the traction battery 301.

The intermediate battery 302 is preferably used only when there a relatively high power discharge/charge is necessary, such as in cases of rapid acceleration or deceleration of the EV. Therefore, a capacity of the intermediate battery 302 can be smaller than a capacity of the traction battery. As a result, the intermediate battery 302 can be fabricated of more expensive materials/technology so as to enable a Peukert k-number as low as possible and to provide fast discharge and charge without significantly increasing the total cost of the battery "pack".

As an illustrative example, the intermediate battery 302 could be kept at a nominal value of charge, for example 50%, such that there is sufficient headroom for the rapid accelerate/decelerate requirements of the EV. For a battery capacity of 100 Ah (equivalent to 40 kWh at an operating voltage of 400V) and assuming a discharge rate of 12 kW, the EV will be powered for over 3.3 hours. However, peak performance for 10 s with a 200 kw motor running at maximum power might consume 0.55 kWh of energy. Assuming the intermediate battery is best maintained at 50% state of charge, then a capacity of 1.11 kWh would be sufficient for the intermediate battery. This means that the capacity of the intermediate battery can be much less that the capacity of the traction battery. In this example, the capacity of the intermediate battery can be approximately 2.75% of the capacity of the traction battery (i.e. 1.1 kWh/40 kWh× 100%).

The controller unit 303 operates between the intermediate battery 102 and the electric motor 304 to control the electric vehicle's speed and acceleration/deceleration. The controller unit 303 is configured to convert DC current from the intermediate battery 302 into a form suitable for use by the electric motor 304. In the case of AC motors, it transforms the intermediate battery's 302 DC current into alternating current. In the case of DC motors, it transforms the intermediate battery's 302 DC current to another DC current suitable for use by the electric motor 304. The controller unit 303 of FIG. 3 comprises a power converter 305 and a controller 306. The power converter 305 may be an inverter for DC-AC conversion when used with an AC electric motor or a converter for DC-DC conversion when used with a DC electric motor.

The controller 306 may also allow a reversal of the polarity of the power supplied to the electric motor 304 (so the vehicle can go in reverse), and permit the electric motor 304 to operate as a generator so that the kinetic energy of motion can be used to recharge the intermediate battery 302 when the brake is applied.

In FIG. 3, the large arrows moving from left to right illustrate the energy flow when the electric motor 304 is operating to drive the EV forward (forward operation). In FIG. 3, the smaller arrows moving from right to left illustrate the energy flow during regenerative breaking (regenerative operation), where the energy flows from the at least one motor 304 (acting as a generator) to the intermediate battery 302. In the embodiment of FIG. 3, the electric motor 304 is always powered from the intermediate battery. The charging controller 308 is configured to receive control signals from the controller unit 303 and manage the transfer of charge between the traction battery and the intermediate battery accordingly.

Figure 4:
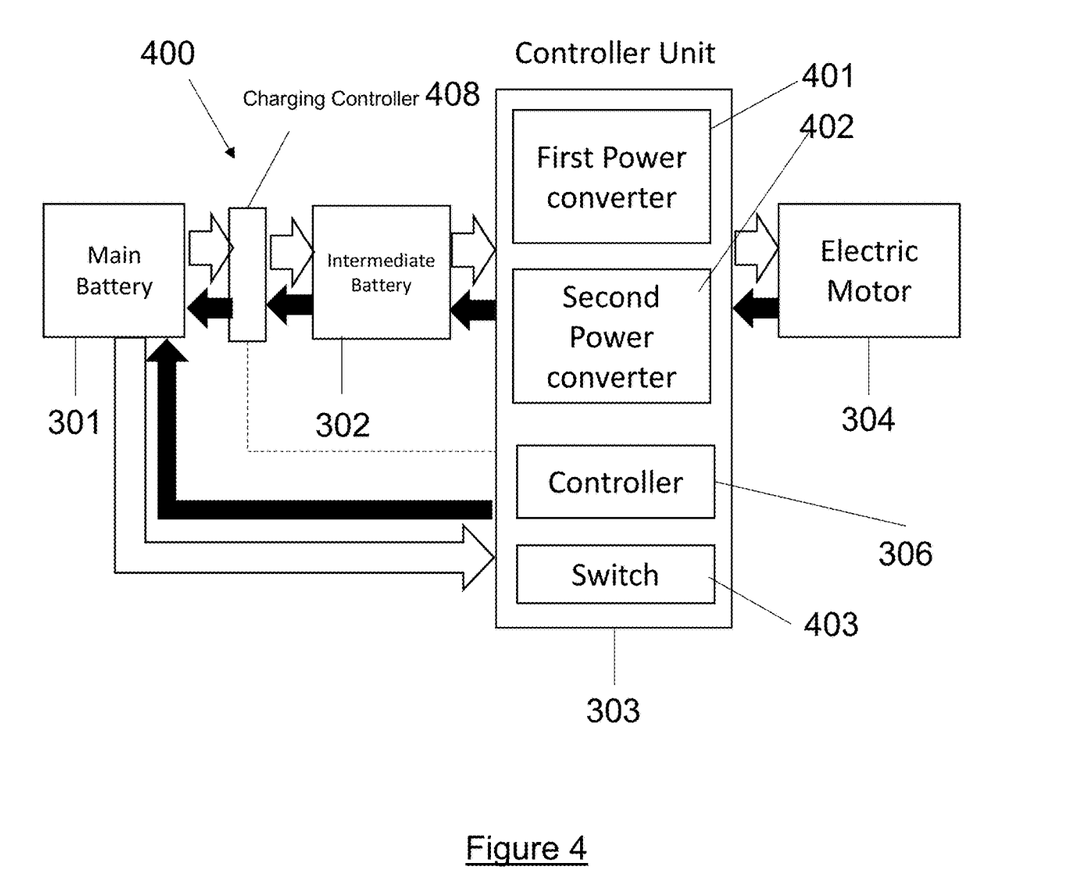
FIG. 4 illustrates a battery power system according to an embodiment.

FIG. 4 illustrates an embodiment where the electric motor can be powered from either or even both of the intermediate battery and the traction battery. FIG. 4 differs from the embodiment of FIG. 3 in that both the traction battery 301 and the intermediate battery 302 are directly and selectively electrically coupled to the controller unit 403, as well as to each other via the charging controller 408. Additionally, the power controller unit 303 comprises a first power converter 401, a second power converter 402, a switch 403 and the controller 306.

The first power inverter 401 is electrically coupled to the intermediate battery 302 and is optimised for operation with the intermediate battery 302. The second power inverter 402 is electrically coupled to the traction battery 301 and is optimised for operation with the traction battery 301.

The switch 403 is configured to switch between at least a first state and a second state. In an embodiment, the switch 403 is a power MOSFET. When in the first state, current can flow between the electric motor 304 and the intermediate battery 302 via the controller unit 303, when the electric motor 304 is in the forward state or the regenerative state. When in the second state, current can flow between the electric motor 304 and the traction battery 301 via the controller unit 303, when the electric motor 304 is in the forward state or the regenerative state.

During regenerative operation of the motor, the controller 306 can determine whether to charge the intermediate battery 302 or the traction battery 301 directly, and operate the switch 403 accordingly. During forward operation, the controller 306 can determine whether to power the electric motor 304 from the intermediate battery 302 or from the traction battery 301 directly, or indeed from both at the same time.

Figure 5:
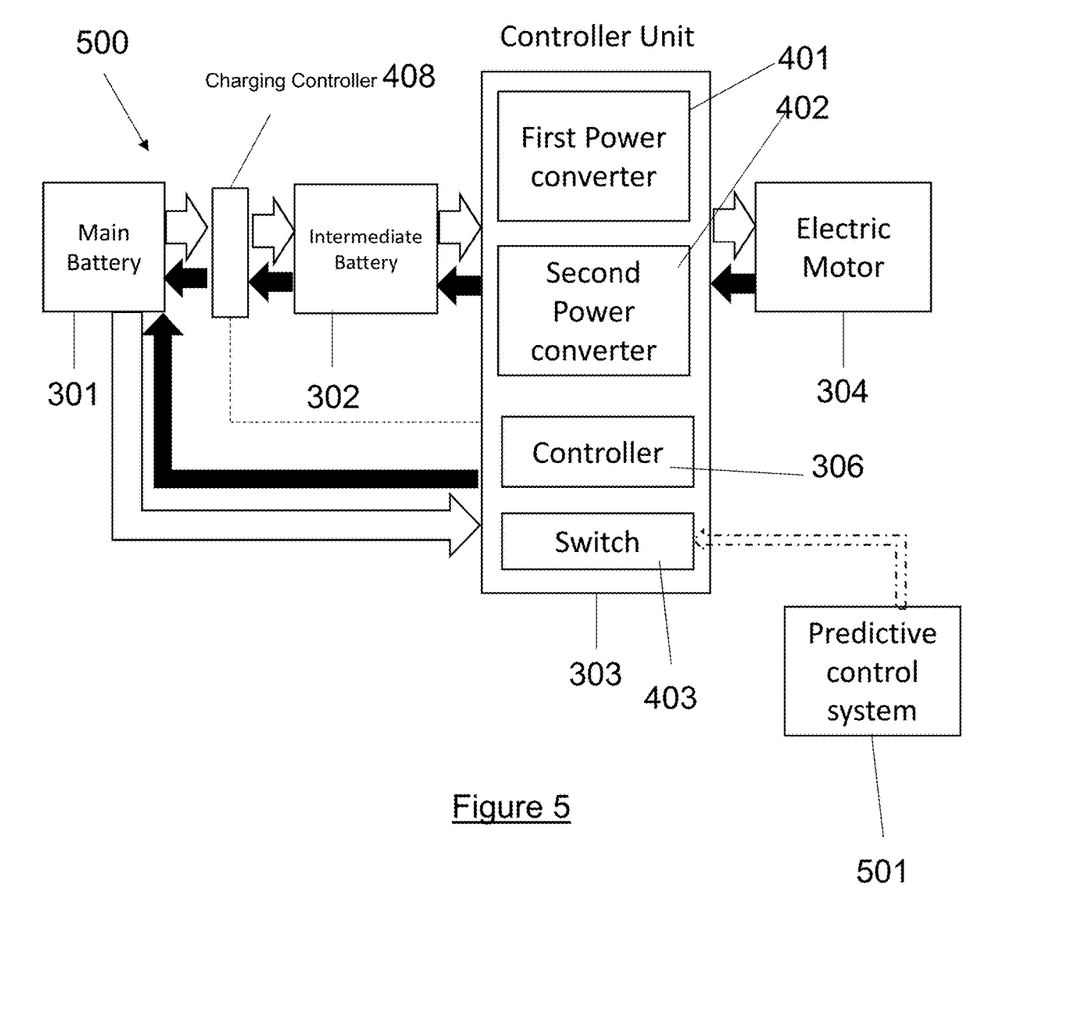
FIG. 5 illustrates a battery power system according to an embodiment.

FIG. 5 illustrates a further embodiment where the operation of the switch 403 is controlled by a predictive control system 501. The battery power system 500 of FIG. 5 differs from the battery power system 400 of FIG. 5 in that there is a predictive control system 501 in communication with the switch 403. The predictive control system 501 may be running on the controller 306 or on another processor that communicates with controller 306. The predictive control system 501 can be directly electrically connected to the switch 403, or wirelessly connected.

The predictive control system 501 predicts if a demand for high current discharge in the case of acceleration (or charge in the case of deceleration) is likely to come at a given time in the future. In an embodiment, the predictive control system 501 receives data such as geolocation data, data related to a driver of the electric vehicle, data related to multiple drivers of electric vehicles, data related to road driving conditions, data regarding driving cycles, data regarding the battery and an operation of the electric motor, real-time traffic data, actual vehicle speed data. Based on the received data, the predictive control system 501 can determine if demand for high current discharge from the intermediate battery 302 or high current charging of the intermediate battery 302 is likely to be required imminently or in the near future.

For example:
From geolocation data it can be determined that the EV is approaching a hill, such that the driver is likely to need to press the accelerator to maintain current speed.
From geolocation data it can be determined that there is a traffic light/jam ahead so the driver is likely to decelerate (so there will be regenerative breaking current).
From geolocation data it can be determined that there is a tight curve in the road so similarly the driver will decelerate.
From learned habits of the driver probable acceleration/deceleration demands can be determined.
Many drivers take the same route every day/often such that it can be predicted on which parts of that route acceleration/deceleration is likely.
If available, the same can be done using data collected from multiple drivers—i.e. an acceleration/deceleration map of the UK/Europe/World can be created. The map can be updated dynamically based on traffic information.

Once it is predicted by the predictive control system 501 that a need for rapid acceleration/deceleration is expected, i.e. when a demand for high current discharge from the intermediate battery 302 or high current charging of the intermediate battery 302 is expected, the predictive control system 501 can cause the switch 403 to move from the second state to the first state, to enable current to flow between the electric motor 304 and the intermediate battery 302 via the controller unit 303.

Figure 6:
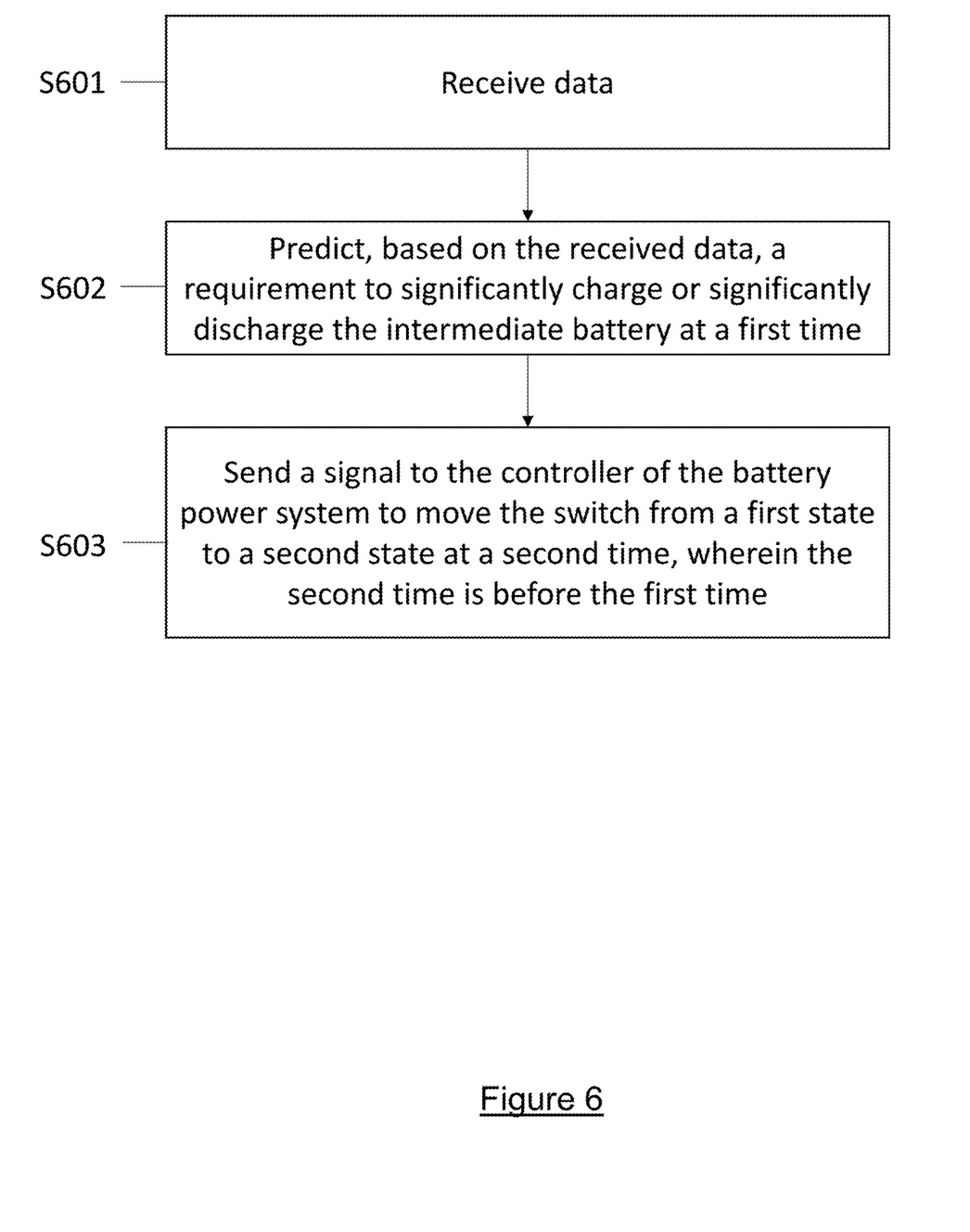
FIG. 6 illustrates a method of controlling a battery power system according to an embodiment.

FIG. 6 illustrates a method of controlling a battery power system according to an embodiment.

At S601, data is received by the predictive control system 501. In an embodiment, the received data comprises at least one of: geolocation data, data related to a driver of the electric vehicle, data related to multiple drivers of electric vehicles, data related to road driving conditions, data regarding driving cycles, data regarding the battery and an operation of the electric motor, real-time traffic data, actual vehicle speed data.

At S602, the predictive control system 501 predicts, based on received data, a requirement to charge or discharge the intermediate battery 302 at a first time.

At S603, sending, by the predictive control system 501, a signal to the controller 306 to switch the switch 403 of the battery power system 500 from a first state to a second state or from a second state to the first state at a second time, wherein the second time is before or the same as the first time.

In a further embodiment, once it is predicted that a demand for high current discharge from the intermediate battery 302 or high current charging of the intermediate battery 302 is required, the predictive control system 501 can further determine if the intermediate battery 302 has sufficient charge stored in it in the case of a high current discharge need, or sufficient space to accommodate current in the case of a high current charging need. The charging controller 408 is operated accordingly to transfer charge between the traction battery and the intermediate battery.

To achieve this, the predictive control system 501 may further receive sensor data, from a sensor coupled to the intermediate battery 302, indicating a current charge capacity of the intermediate battery 302 (e.g. a sensor or sensors detecting voltage, temperature of the cells, peak and average current). Based on the sensor data, the predictive control system 501 determines if the charge level of the intermediate battery 302 is at a desired charge level. The charge level of the intermediate battery is the amount of current available in the intermediate battery as a percentage of the total capacity of the battery. The desired charge level is a level of current required in the intermediate battery 302 to meet the requirements to charge or discharge the intermediate battery at the first time.

The predictive control system 501 may also be used to prepare the intermediate battery for an expected high charge or high discharge. For example, if the driving route is expected to traverse a steep hill in the near future, the traction battery may be used to increase the charge level of the intermediate battery in anticipation, e.g. to 100% or near 100%. This might be done in parallel with the traction battery supplying drive power to the motor. Similarly, if a steep downhill section is expected, power may be drawn from the intermediate battery, either by recharging the traction battery or by supplying drive power to the motor, in order to create space in the intermediate battery for the expected recharge.

Figure 7:
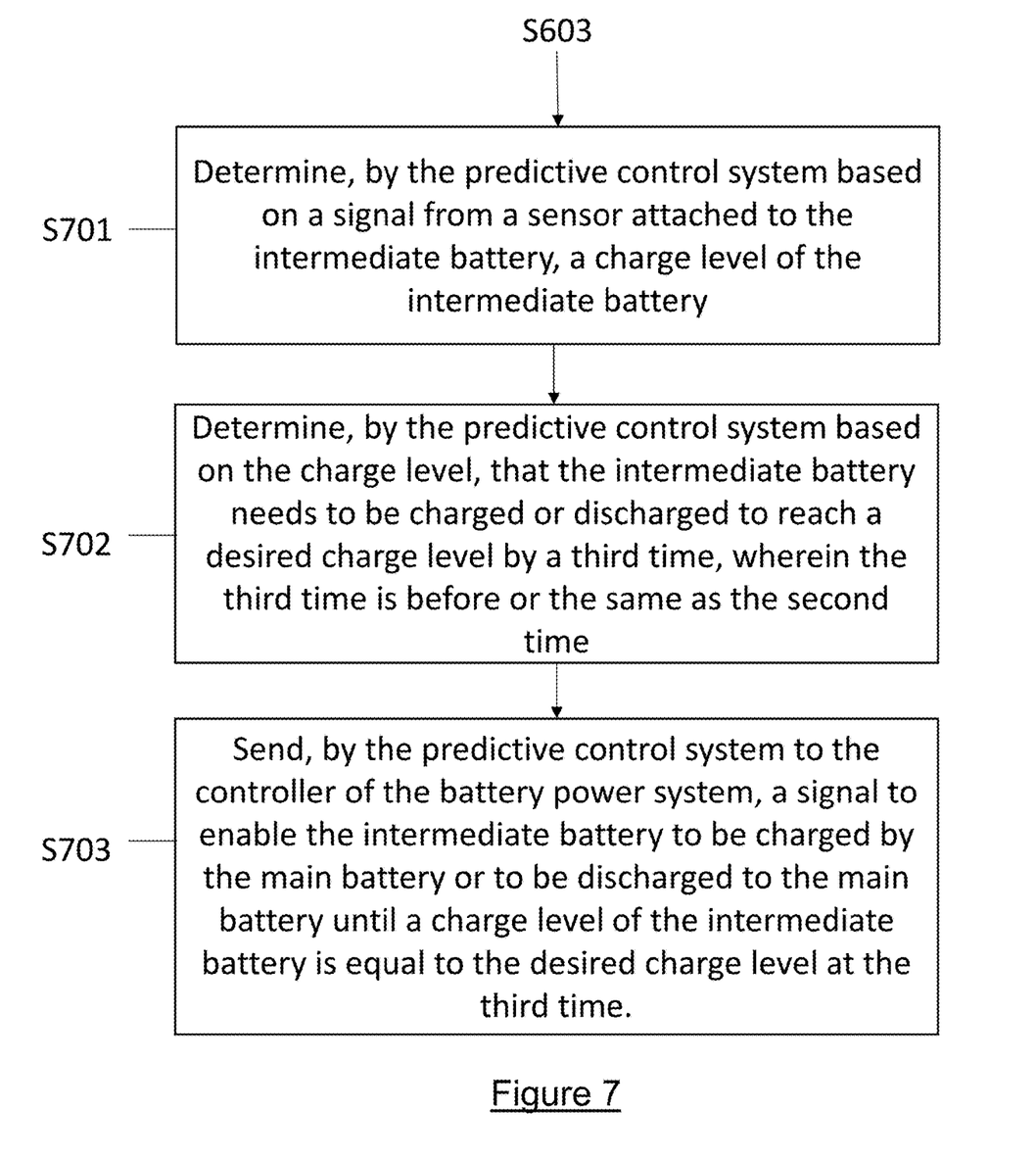
FIG. 7 illustrates a method of controlling a battery power system according to an embodiment.

FIG. 7 illustrates further steps of a method of controlling a battery power system 500 according to an embodiment.

At S701, the predictive control system 501 determines, based on a signal from a sensor attached to the intermediate battery 302, a charge level of the intermediate battery 302.

At S702, the predictive control system 501 determines, based on the charge level, that the intermediate battery 302 needs to be charged or discharged to reach a desired charge level by a third time, wherein the third time is before or the same as the second time.

At S703, the predictive control system 501 sends, to the controller 306 of the battery power system 500, a signal to enable the intermediate battery 302 to be charged by the traction battery 301 or to be discharged to the traction battery 301 until a charge level of the intermediate battery 302 is equal to the desired charge level at the third time.

It will be appreciated that intelligent control of the intermediate battery 302, the whole battery power system can be made more efficient and cost effective.

Figure 8:
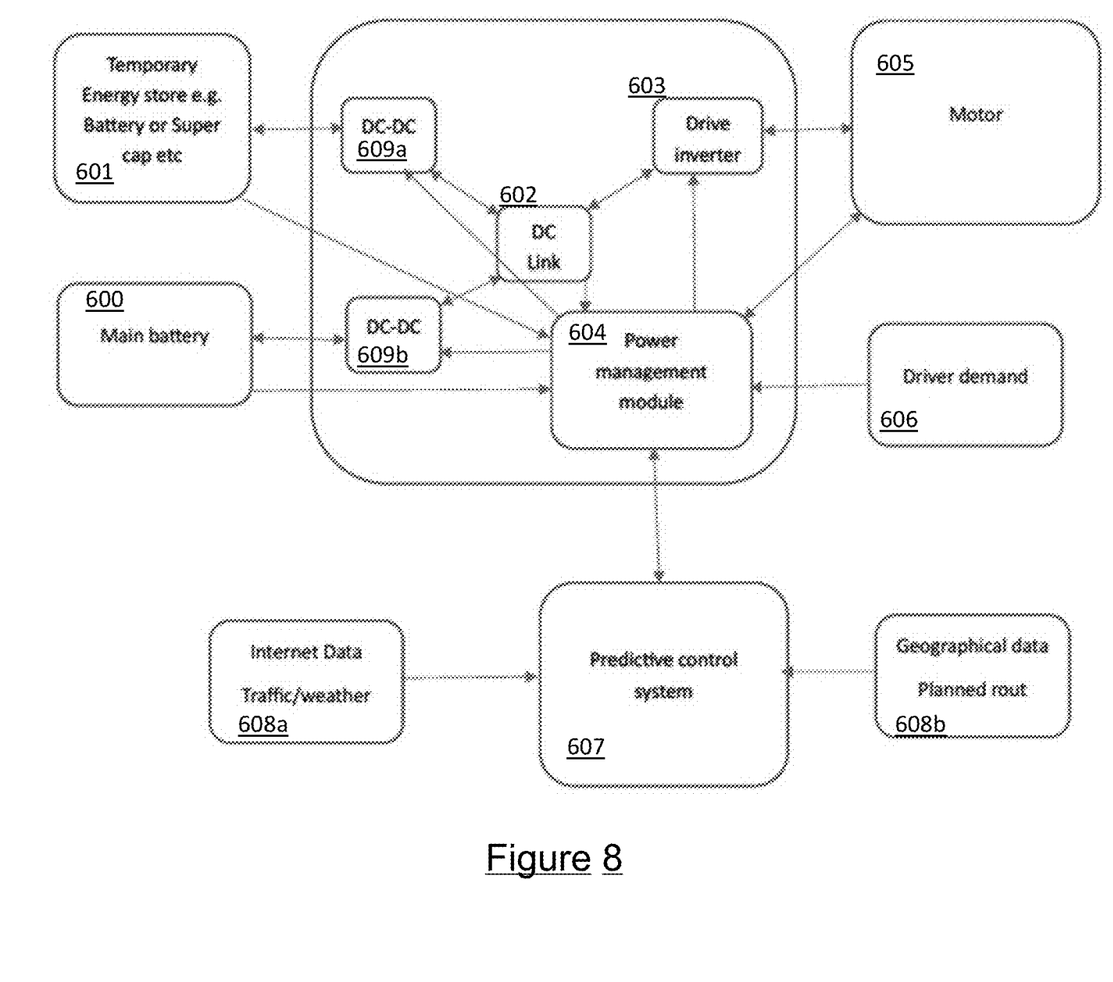
FIG. 8 illustrates schematically an alternative battery power system.

FIG. 8 illustrates schematically a further battery power system configuration in which a main battery 600 and an intermediate battery 601 are connected, via respective DC-DC converters 609a, 609b, to a DC link 602 which represents a common voltage point. A drive inverter 603 is also connected to the DC link. The DC link receives control signals from a power management module 604 which operates in a similar way to the controller unit discussed above, i.e. a set the common voltage at the DC link and to coordinate the transfer of power between the main batter, the intermediate battery, and the drive inverter. FIG. 8 also illustrates the motor 605 that receives power from the drive inverter, and a driver demand unit 606 which might in turn receive inputs from, e.g. an accelerator and brake.

The power management module 604 also receives inputs from a predictive control system 607 the operation of which will be understood from the discussion above. Merely by way of example FIG. 8 shows the predictive control system receiving inputs from units 608a, 608b providing information concerning; internet data such as traffic conditions and weather, geographical data, planned driving route.

The person of skill in the art will appreciate that various modifications may be made to the above described embodiments without departing from the scope of the present invention. In one exemplary modification, the intermediate battery is replaced with a supercapacitor ("supercap"), sometimes also referred to as an ultracapacitor. A supercap is a high-capacity capacitor, with a capacitance value much higher than other capacitors but with lower voltage limits. An exemplary supercap might store 10 to 100 times more energy per unit volume or mass than electrolytic capacitors, may accept and deliver charge much faster than conventional traction batteries, and may tolerate many more charge and discharge cycles than rechargeable batteries.

The invention claimed is:

1. A battery power system for powering at least one electric motor, the battery power system comprising:
   a main battery;
   an intermediate storage device electrically coupled to the main battery such that the intermediate storage device can be charged by the main battery, and the intermediate storage device being configured to supply power to the electric motor; and
   a power controller electrically coupled to the intermediate storage device to electrically couple power from the intermediate storage device to the electric motor, the power controller comprising,
   a first power converter configured to convert power received from the intermediate storage device from a first type to a second type to power the electric motor and to convert regenerated power received from the electric motor from the second type to the first type for storage in the intermediate storage device,
   wherein the intermediate storage device is constructed and configured to accept and deliver charge at a higher rate than the main battery whilst having a lower energy storage capacity than the main battery.

2. A battery power system according to claim 1, wherein the intermediate storage device is an intermediate battery having a Peukert constant less than a Peukert constant of the main battery, and an energy storage capacity less than an energy storage capacity of the main battery.

3. A battery power system according to claim 2, wherein the Peukert constant of the intermediate battery is less than 1.1 and the Peukert constant of the main battery is greater than 1.1.

4. A battery power system according to claim 1, wherein the intermediate storage device is a supercapacitor.

5. A battery power system according to claim 1, wherein the capacity of the intermediate storage device is 10% or less than the capacity of the main battery.

6. A battery power system according to claim 1, wherein the power controller is further directly electrically coupled to the main battery, the power controller further comprising:
- a second power converter configured to convert power received from the main battery from a third type to said second type to power the electric motor and, optionally, to convert regenerated power received from the electric motor from the second type to the third type for storage in the main battery;
- a switching circuit for selectively coupling the first and/or second power converters to the electric motor.

7. A battery power system of claim 6, the power controller further comprising a predictive control system configured to identify a future event and operate said switching circuit in anticipation of that event.

8. A battery power system according to claim 1, the power controller further comprising a predictive control system configured to identify a future event that might require a higher or lower level of charge in the intermediate storage device than is currently stored in the device and, in response, cause the power controller to charge or discharge the intermediate battery to that higher or lower level.

9. A method according to claim 7, wherein the predictive control system comprises a machine-learning model.

10. An electric vehicle comprising:
- one or more electric motors; and
- the battery power system of claim 1 electrically coupled to the or each electric motor to supply power thereto.

11. An electric vehicle according to claim 10, the battery power system further comprising a predictive control system configured to identify one or more of current operating conditions, future operating conditions and a future event, and charge or discharge the intermediate battery accordingly.

12. An electric vehicle according to claim 11, wherein the predictive control system receives data comprising at least one of:
- geolocation data,
- topographical data,
- data related to an operator of the electric motor of the electric vehicle,
- data related to multiple drivers of electric vehicles,
- data related to road driving conditions,
- data regarding driving cycles,
- data regarding the battery and an operation of the electric motor,
- real-time traffic data,
- actual vehicle speed data.

13. An electric vehicle according to claim 11, the predictive control system being dynamic such that it operates to charge or discharge the intermediate battery whilst the vehicle is in use.

* * * * *